(12) United States Patent
Nakano et al.

(10) Patent No.: US 7,970,917 B2
(45) Date of Patent: Jun. 28, 2011

(54) VIRTUAL FILE SERVERS WITH STORAGE DEVICE

(75) Inventors: Takahiro Nakano, Yokohama (JP);
Kenichi Miyata, Kawasaki (JP);
Takashi Horiuchi, Yokohama (JP);
Naoto Matsunami, Hayama (JP);
Junichi Hara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/687,305

(22) Filed: Jan. 14, 2010

(65) Prior Publication Data

US 2010/0115055 A1 May 6, 2010

Related U.S. Application Data

(63) Continuation of application No. 10/375,197, filed on Feb. 28, 2003, now Pat. No. 7,673,012.

(30) Foreign Application Priority Data

Jan. 21, 2003 (JP) ................................. 2003-011965

(51) Int. Cl.
*G06F 15/16* (2006.01)
*G06F 15/173* (2006.01)

(52) U.S. Cl. ..................... 709/229; 709/223; 709/226

(58) Field of Classification Search .................. 709/217, 709/219–220, 223, 226, 229
See application file for complete search history.

(56) References Cited

U.S. PATENT DOCUMENTS

| | | | |
|---|---|---|---|
| 5,657,445 A | 8/1997 | Pearce | |
| 5,761,655 A | 6/1998 | Hoffman | |
| 5,901,312 A | 5/1999 | Radko | |
| 6,055,602 A | 4/2000 | McIlvain et al. | |
| 6,101,607 A | 8/2000 | Bachand et al. | |
| 6,219,771 B1 | 4/2001 | Kikuchi et al. | |
| 6,324,581 B1 | 11/2001 | Xu et al. | |
| 6,393,569 B1 | 5/2002 | Orenshteyn | |
| 6,408,336 B1 | 6/2002 | Schneider et al. | |
| 6,421,711 B1 | 7/2002 | Blumenau et al. | |
| 6,424,715 B1 | 7/2002 | Saito | |
| 6,499,075 B2 | 12/2002 | Oeda et al. | |
| 6,523,096 B2 | 2/2003 | Sanada et al. | |
| 6,571,245 B2 | 5/2003 | Huang et al. | |
| 6,606,690 B2 | 8/2003 | Padovano | |
| 6,643,690 B2 | 11/2003 | Duursma et al. | |
| 6,714,968 B1 | 3/2004 | Prust | |
| 6,728,844 B2 | 4/2004 | Sanada et al. | |
| 7,281,111 B1 | 10/2007 | Blumenau | |
| 2001/0037379 A1 | 11/2001 | Livnat | |

(Continued)

FOREIGN PATENT DOCUMENTS

EP 1011046 6/2000

(Continued)

OTHER PUBLICATIONS

DATA ONTAP 6.2 Multistore Administration Guide, Mar. 2002.

(Continued)

*Primary Examiner* — Hussein A Elchanti
(74) *Attorney, Agent, or Firm* — Brundidge & Stanger, P.C.

(57) ABSTRACT

A system renting out file servers to many companies in a data center has a security problem so that the user cannot perform operation needing manager authorization in the file servers. An OS provides execution administrative area information of an application program designated by process information which can specify the range of an accessible device to operate the server system of the customer in the administrative area information.

11 Claims, 14 Drawing Sheets

U.S. PATENT DOCUMENTS

| | | |
|---|---|---|
| 2001/0052073 A1 | 12/2001 | Kern et al. |
| 2002/0013832 A1 | 1/2002 | Hubbard |
| 2002/0026495 A1 | 2/2002 | Arteaga |
| 2002/0026558 A1 | 2/2002 | Reuter et al. |
| 2002/0029263 A1 | 3/2002 | Toyoshima et al. |
| 2002/0040405 A1 | 4/2002 | Gold |
| 2002/0052941 A1 | 5/2002 | Patterson |
| 2002/0059427 A1 | 5/2002 | Tamaki et al. |
| 2002/0083120 A1 | 6/2002 | Soltis |
| 2002/0091722 A1 | 7/2002 | Gupta et al. |
| 2002/0095602 A1 | 7/2002 | Pherson et al. |
| 2002/0099901 A1 | 7/2002 | Tanaka et al. |
| 2002/0103889 A1 | 8/2002 | Markson et al. |
| 2002/0129048 A1 | 9/2002 | Qiu et al. |
| 2002/0156984 A1 | 10/2002 | Padovano |
| 2002/0174237 A1 | 11/2002 | Shrinivasan et al. |
| 2003/0023665 A1 | 1/2003 | Matsunami et al. |
| 2003/0044076 A1 | 3/2003 | Mitchell et al. |
| 2003/0110190 A1 | 6/2003 | Achiwa et al. |
| 2003/0131157 A1 | 7/2003 | Hoese et al. |
| 2003/0135578 A1 | 7/2003 | Banga et al. |
| 2003/0154314 A1 | 8/2003 | Mason, Jr. et al. |
| 2003/0163568 A1 | 8/2003 | Kano et al. |
| 2003/0172069 A1 | 9/2003 | Uchiyama et al. |
| 2003/0172288 A1 | 9/2003 | Sasage |
| 2003/0177324 A1 | 9/2003 | Timpanaro-Perrotta |
| 2003/0191745 A1 | 10/2003 | Jiang et al. |
| 2003/0191810 A1 | 10/2003 | Muhlestein et al. |
| 2003/0195942 A1 | 10/2003 | Muhlestein et al. |
| 2003/0204572 A1 | 10/2003 | Mannen et al. |
| 2003/0229645 A1 | 12/2003 | Mogi et al. |
| 2003/0233571 A1 | 12/2003 | Kraus et al. |
| 2004/0030668 A1 | 2/2004 | Pawlowski et al. |
| 2004/0030822 A1 | 2/2004 | Rajan et al. |
| 2004/0034671 A1 | 2/2004 | Kodama |
| 2004/0059822 A1 | 3/2004 | Jiang et al. |
| 2004/0059932 A1 | 3/2004 | Takeuchi |
| 2004/0078467 A1 | 4/2004 | Grosner et al. |
| 2005/0021727 A1 | 1/2005 | Matsunami et al. |

FOREIGN PATENT DOCUMENTS

| | | |
|---|---|---|
| EP | 1315074 | 5/2003 |
| JP | 2001-325207 | 11/2001 |
| JP | 2002-24192 | 1/2002 |

OTHER PUBLICATIONS

Notification of Reason(s) for Refusal, dated Jun. 30, 2009, issued in corresponding Japanese Patent Application No. 2003-011965.

FIG. 3 — Administrative Area Information 232 for Company A

FIG. 9

Mount Processing Program 808

- Start
- 901: Calling the Permitted Device Decision Program 213 to Determine whether the Requested Device is Permitted or Not
- 902: As the Result of Step 901, Does the Requested Device Access is Permitted?
  - No → 511: Error Return
  - Yes → 903
- 903: Calling the Storage I/O Processing Program 215 to Open the requested Device
- 904: Adding an Entry to the File System Table 810
- 905: Adding an Entry to the Mount Table 331
- 906: Normal Return

VIRTUAL FILE SERVERS WITH STORAGE DEVICE

CROSS REFERENCES

The present application claims priority from Japanese Patent Application No. 2003-011965, filed Jan. 21, 2003 and is a continuation of application Ser. No. 10/375,197, filed Feb. 28, 2003 now U.S. Pat. No. 7,673,012, the contents of which are incorporated herein by reference.

BACKGROUND OF THE INVENTION

The present invention relates to a network connection type storage, a server system and an operating system.

When providing a service using the Internet, companies may use a service provided by a data center to reduce Internet connecting equipment and the cost of building a computer system.

The data center has Internet connecting equipment and rents out server installation space and servers of companies (customers) which desire to provide a service using the Internet. Generally, independent storages rented out to the customers are often allocated to hold security between the customers.

However, in the method for allocating independent storages to customers, it is difficult to change the storage volume flexibly rented out according to change in demand of the customers. All storages must be monitored for failure. The managing cost is higher due to increase in the number of storages.

Logically divided bulk storages are logical volumes. Customer servers and the bulk storages are connected by the SAN (Storage Area Network). Managing the storages can be concentrated to reduce the managing cost. However, a fiber channel interface which is currently dominant in the SAN is expensive. Customers make an agreement by a money amount according to installation space. There is no enough space for adding the interface to the customer servers.

The NAS (Network Attached Storage) uses the NFS service and the CIFS service so that a file system incorporated into the NAS or generated on a storage connected via a storage interface such as SCSI and a fiber channel can store a file into other information processors and share it via a network. The NAS can release a file system below the specified directory and can be set to release plural directories.

For Internet connection, in the data center, almost all customer servers have a network interface. The NAS can provide a storage service to plural customers without adding hardware to the customer servers. The NAS often uses a general-purpose OS (operating system) and may suffer from damages caused by hacking of a malicious user and file tampering and file deletion due to virus. When the plural customers share the NAS, these damages may affect all the customers sharing the same NAS.

The NAS of Network Appliance has MultiStore ("Data ONTAP 6.2 MultiStore Administration Guide"). This can provide plural virtual servers called vfiler such as the CIFS service and the NFS service having one or more IP addresses and volumes on one system. The vfiler is allocated to each customer, permitting user management and independent setting for each customer.

The vfiler allows the customer to execute a command using the rsh protocol. The setting of the NFS service can be changed. A back-up device connected to the NAS cannot be used. To use the back-up device connected to the NAS, a system managing the entire system must be used.

A system using virtual computers to allocate an independent OS to each customer for providing a service is disclosed in Japanese Patent Application Laid-Open No. 2002-024192. In the technique described in Japanese Patent Application Laid-Open No. 2002-024192, plural OSes are operated on one computer to allocate an independent resource, that is, a main storage and a network adapter to each of the OSes. Since the resource is not shared between the OSes, user management and independent setting for each customer can be made easily. Further, the system can be used for back-up by allocating the resource of a back-up device.

SUMMARY OF THE INVENTION

In order that the data center can ensure security to companies (customers) who desire to provide a service using the Internet and can change the storage volume rented out according to change in demand, the prior art system has both merits and demerits. For example, in the method for sharing the NAS using a general-purpose OS by plural customers, when the NAS is hacked by access through a breach of the security of one customer, the resource for each customer is not isolated on the NAS. The damage may affect all the customers sharing the NAS. When the NAS uses a back-up device connected to the NAS for back-up, an application such as a database using the file sharing service of the NAS is brought into a back-up mode. The operation of the customer server holding matching of data on the disk and the back-up operation transferring data to the back-up device must be engaged. The operation is troublesome.

In the MultiStore method, the customer side does not have the management authorization of a tape device. So, the operation of the customer side cannot sample back-up. The vfiler cannot flexibly change the range of the management authorization given to the customer. When the management authorization is given to the customer to restore data from the tape device, data is developed to the disk area of other customers by an operation error of the customer side, giving damage to the other customers. The security problem among the customers such as achieving access to data of the other customers arises.

In the method using virtual computers, all resources are allocated to the virtual computers. The resource allocation may not be uniform depending on the operation state of the virtual computers. A cache area caching data on the disk on the main storage to make file access faster is independent for each of the virtual computers. The low-load virtual computer has an extra cache area, which cannot be the cache area of the high-load virtual computer. This is because the allocation change of the main storage is not easy, for example, the virtual computer must be restarted.

The present invention can realize a data center which independently permits or limits not only an IP address and a volume but also the access right of a physical device and a logical device and can function as a virtual server increasing the free degree of operating management. The physical device or the logical device which can be accessed from the virtual server is limited. The influence by illegal access from a customer can be eliminated. The management authorization necessary for the operating management can be given flexibly to the customer.

Specifically, an OS incorporates a function that sets in detail the management authorization given to the customer side and a function limiting customer operation so as not to exceed the range of the management authorization given to the customer side. Specifically, to process information managed by the OS, administrative area information is added for executing an application program designated by the process information. Newly generated process information takes over the administrative area information. This adds the administrative area information to all process information of the application program executed by the customer. The administrative area information includes accessible physical devices or logical devices, accessible network I/F (interface), a network routing table, a protocol table, a mount table of a file system, and a process information list belonging to the administrative area information.

For the data center manager, a function generating process information having specified administrative area information and a function changing the administrative area information are provided.

For the problem that back-up cannot be sampled into the tape only by operation of the customer side can be solved as follows. The management authorization of the tape device is given to the customer on the OS, as one administrative area information. The data center manager uses the function changing the administrative area information to give the management authorization of the tape device to the customer when necessary.

The present invention can realize a virtual server function for each customer on a single OS managing the shared resources together. The resources managed together by the OS are equivalently used to a request of any application program designated by the process information. The resources can be used effectively according to a load, so the load in the virtual computers will be uniform.

BRIEF DESCRIPTION OF THE DRAWINGS

FIG. 9 is a diagram showing the processing flow of a mount processing program 808 including device allocation of the processing functions of the file system processing program 214;

DESCRIPTION OF THE PREFERRED EMBODIMENT

Embodiment I

Embodiment 1 of the present invention will be described below in detail using FIGS. 1 to 13. First, the overview of components according to the present invention will be described. Next, processing procedures and data structures will be described in detail.

Figure 1:
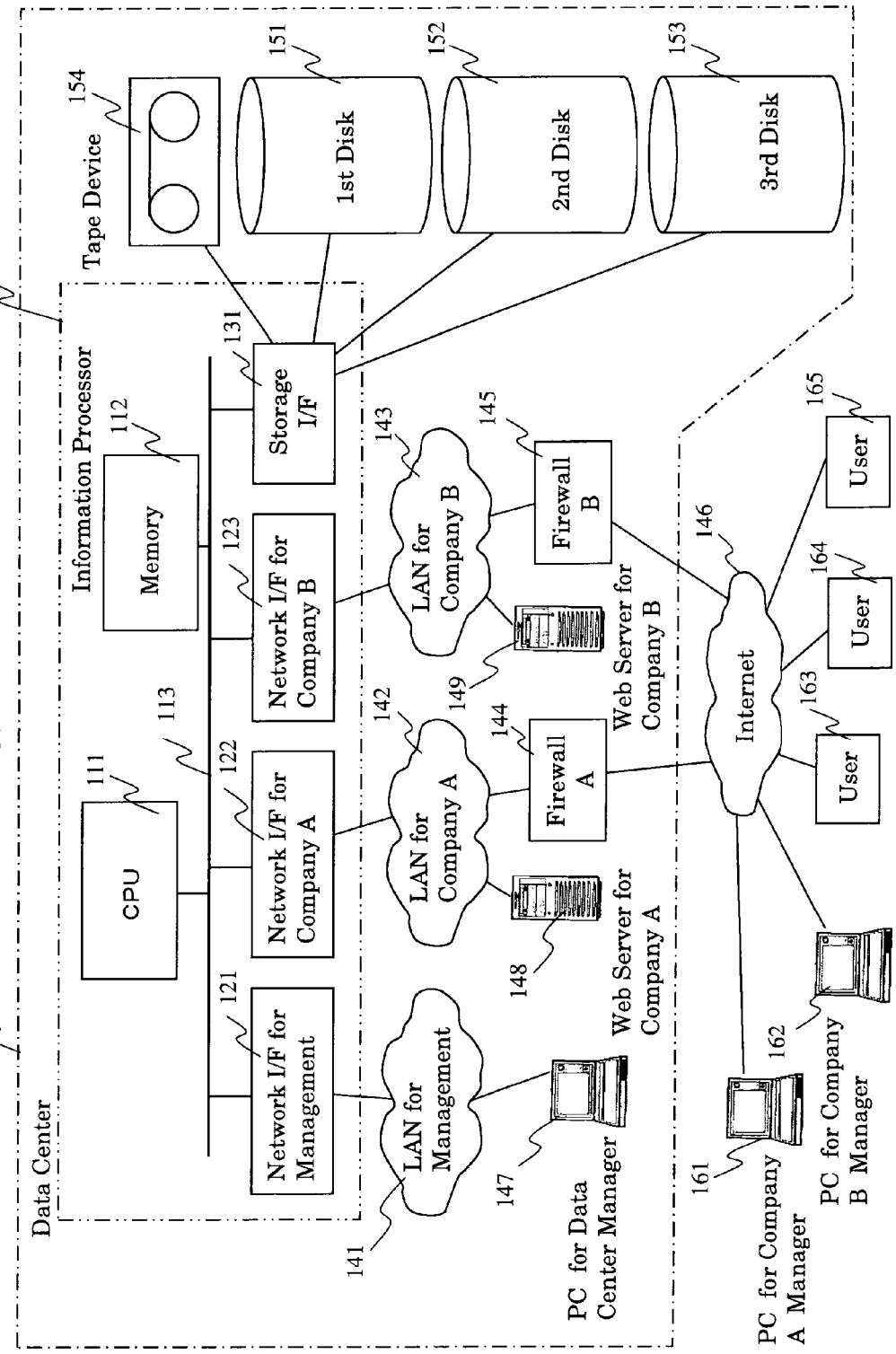
FIG. 1 is a diagram showing an example of a system of the present invention.

FIG. 1 is a diagram showing an example of an effective system by applying the present invention. The numeral 101 denotes a data center. The data center 100 is provided with an information processor 101 which is connected to a PC for data center manager 147, a Web server for company A 148 and a Web server for company B 149 via LAN for management 141, LAN for company A 142 and LAN for company B 143, respectively. The LAN for company A 142 and the LAN for company B 143 are connected to Internet 146 via a firewall A 144 and a firewall B 145. The information processor 101 is provided with a bus 113 which is connected to a CPU 111, a memory 112, network I/F for management 121, network I/F for company A 122, network I/F for company B 123 and storage I/F 131. The CPU 111 executes an application program designated by process information. As described later, the CPU 111 executes the processing programs of various processing parts of an OS to generate and manage administrative area information.

The network I/F for management 121 is connected to the LAN for management 141. The network I/F for company A 122 is connected to the LAN for company A 142. The network I/F for company B 123 is connected to the LAN for company B 143. The LAN for management 141 is LAN for data center management. The manager manages the information processor 101 by the PC for data center manager 147 connected thereto. The LAN for company A 142 is LAN for company A using a storage service of the data center and is connected to the Web server for company A 148 and the firewall A 144. The LAN for company B 143 is LAN for company B using a storage service of the data center and is connected to the Web server for company B 149 and the firewall B 145.

The storage I/F 131 is connected to a 1st hard disk 151, a 2nd hard disk 152, a 3rd hard disk 153 (Hereinafter, the hard disk is called a disk.) and a tape device 154. The 1st disk 151 stores data and necessary programs used for managing the information processor 101. The 2nd disk 152 and the 3rd disk 153 of a suitable logical volume structure are used for storing data for providing the Web services for the company A and the company B. The company A and the company B use the tape device 154 for data back-up. The 2nd disk 152 and the 3rd disk 153 of a suitable logical volume structure are allocated to the company A and the company B, which is advantageous in operation. In the following description, for simplifying the description, the 2nd disk 152 and the 3rd disk 153 are allocated to the company A and the company B.

The data center 100 is accessed from outside via the Internet 146. The numeral 161 denotes a PC for company A manager and the numeral 162, a PC for company B manager. When the company A manager and the company B manager must correct the contents of the Web service or store data of the use state of the Web service as back-up into the tape, they use the PC for company A manager 161 and the PC for company B manager 162 to access the Web server for company A 148 and the Web server for company B 149. Further, general users 163-165 connected to the Internet 146 access the Web server for company A 148 and the Web server for company B 149 to use the Web service.

It is important that the data center 100 can increase the free degree of the operating management of the customer and eliminate the influence of illegal access from the customer or the general users.

Figure 2:
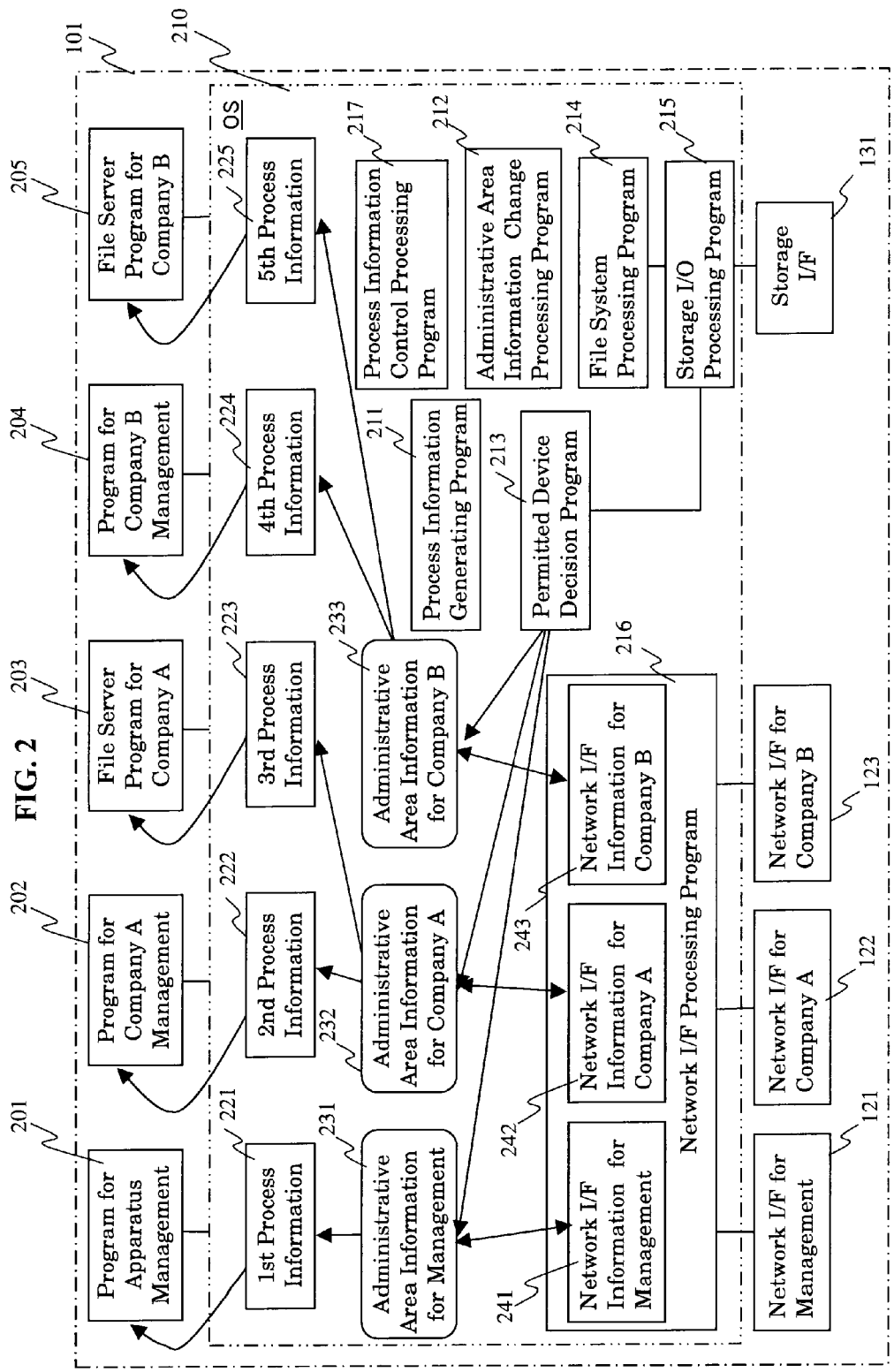
FIG. 2 is a diagram showing main software and data operated on in an information processor 101 and their relation.

FIG. 2 is a diagram showing main programs and information operated on the information processor 101 and their relation.

On the memory 112 of the information processor 101, there are installed, as application programs, a program for apparatus management 201, a program for company A management 202, a file server program for company A 203, a program for company B management 204 and a file server program for company B 205. These are stored into the 1st disk 151 to be developed by the memory 112 when necessary.

The program for apparatus management 201 is an application program operated on the information processor 101 and is communicated with the PC for data center manager 147. The program for apparatus management 201 starts the program for company A management 202 and the program for company B management 204 and changes the access permission of the tape device 154 to administrative area information for company A 232 and administrative area information for company B 233.

The program for company A management 202 sets operation of the file server program for company A 203 to start the file server program for company A 203. The program for company A management 202 is communicated with the Web server for company A 148 to which the company A manager accesses from the PC for company A manager 161 for login to stop and restart the file server program for company A 203 for making back-up of data to the tape device 154.

The file server program for company A 203 receives a file access request requested by the Web server for company A 148. The file server program for company A 203 uses the file system processing program 214 provided by an OS (operating system) 210 to write and read a file to/from the 2nd disk 152, and returns the result to the Web server for company A 148.

The operation of the program for company B management 204 and the file server program for company B 205 is similar to that of the program for company A management 202 and the file server program for company A 203.

The OS 210 stores various information. Based on the information, the OS 210 is operated on the information processor 101 to provide various interfaces to the application programs 201 to 205. The OS 210 performs control of process information and I/O processing and provides a file system service.

As information stored, there are 1st process information 221, 2nd process information 222, - - - , 5th process information 225 necessary for allocation of the CPU 111 which is an executing substance to the above application programs; administrative area information for management 231, administrative area information for company A 232 and administrative area information for company B 233 which are permitting and limiting information of an accessible device when various application programs are executed based on the information; and network I/F information 241 for management, network I/F information for company A 242 and network I/F information for company B 243 which are managing information for the network I/F for management 121, the network I/F for company A 122 and the network I/F for company B 123.

The OS 210 stores various processing parts. The processing part refers to a program for performing the function of the OS. These are as follows: a process information generating program 211 called when generating process information; a process information control processing program 217 controlling stop, termination and restart of the application program designated by the process information; an administrative area information change processing program 212 called when changing information permitting and limiting a device accessible to the application program designated by the process information; a permitted device decision program 213 checking its validity at access to the device; a file system processing program 214 providing a file system service; and a storage I/O processing program 215 performing input and output from/to the 1st disk 151, the 2nd disk 152, the 3rd disk 153 and the tape device 154 connected to the storage I/F 131; and a network I/F processing program 216 performing communication via the network I/F 121, the network I/F 122 and the network I/F 123.

The 1st process information 221 is process information designating the program for apparatus management 201 and is information for managing the operation of the program for apparatus management 201. The 1st process information 221 belongs to the administrative area information for management 231 and is given a limit for an accessible device based on the information.

The 2nd process information 222 is process information designating the program for company A management 202 and is information for managing the operation of the program for company A management 202. The 3rd process information 223 is process information designating the file server program for company A 203 and is information for managing the operation of the file server program for company A 203. The 2nd process information 222 and the 3rd process information 223 belong to the administrative area information for company A 232 and are given a limit for an accessible device based on the information.

The 4th process information 224 is process information designating the program for company B management 204 and is information for managing the operation of the program for company B management 204. The 5th process information 225 is process information designating the file server program for company B 205 and is information for managing the operation of the file server program for company B 205. The 4th process information 224 and the 5th process information 225 belong to the administrative area information for company B 233 and are given a limit for an accessible device based on the information.

The administrative area information for management 231 is separated in FIG. 2 and is assumed to integrate the 1st process information 221 and the network I/F information for management 241 corresponding to the network I/F for management 121. The administrative area information for management 231 performs apparatus management. The administrative area information for management 231 can be accessed only by the data center manager from the PC for data center manager 147 via the LAN for management 141 and is managed to hold information for managing the access right to all the devices.

The administrative area information for company A 232 is separated in FIG. 2 and is assumed to integrate the 2nd process information 222, the 3rd process information 223 and the network I/F information for company A 242 storing the managing information corresponding to the network I/F for company A 122. The administrative area information for company A 232 provides operation administrative area information of the file server program for company A 203 and is managed by the PC for data center manager 147 so as to hold information for managing the access right to the 2nd disk 152 and the device of the network I/F for company A 122 permitted to the company A by the agreement of the data center 100 and the company A. The access right from the PC for company A manager 161 of the company A manager via the LAN for company A 142 to the tape device 154 is given only by a predetermined time by the agreement.

The administrative area information for company B 233 is separated in FIG. 2 and is assumed to integrate the 4th process information 224, the 5th process information 225 and the network I/F information for company B 243 storing the managing information corresponding to the network I/F for company B 123. The administrative area information for company B 233 provides operation administrative area information of the file server program for company B 205 and is managed by the PC for data center manager 147 so as to hold information for managing the access right to the 3rd disk 153 and the device of the network I/F for company B 123 permitted to the company B by the agreement of the data center 100 and the company B. The access right from the PC for company B manager 162 of the company B manager via the LAN for company B 143 to the tape device 154 is given only by a predetermined time by the agreement.

The network I/F information for management 241, the network I/F information for company A 242 and the network I/F information for company B 243 correspond to the network for management 121, the network for company A 122 and the network for company B 123, respectively, and are managing information of the network interfaces. They store the pointer of administrative area information to which the network I/F belongs and can uniquely decide administrative area information storing received data. The network I/F information for management 241, the network I/F information for company A 242 and the network I/F information for company B 243 are independent information. As described above, they are handled to be integral with the administrative area information for management 231, the administrative area information for company A 232 and the administrative area information for company B 233.

The process information generating program 211 is a program called by the program for apparatus management 201, the program for company A management 202 and the program for company B management 204. The process information generating program 211 has a function generating process information belonging to the same administrative area information as the application program calling the same. In addition to this, the process information generating program 211 has a function specifying administrative area information to generate new administrative area information and generating process information belonging to the administrative area information. The function generating new administrative area information is enabled only in execution of the program for apparatus management 201 belonging to the administrative area information for management 231. That is, the manager authorization is given only to the data center manager.

The process information control processing program 217 can control stop, termination and restart of the application program designated by the process information. In this function, the program for apparatus management 201 designated by the 1st process information 221 belonging to the administrative area information for management 231 can control all the application programs. The application programs designated by the process information not belonging to the administrative area information for management 231 (the programs designated by the 2nd process information 222 to the 5th process information 225 belonging to the administrative area information for company A 232 and the administrative area information for company B 233) can control only the application program belonging to the same administrative area information.

The administrative area information change processing program 212 can set and change permission and prohibition of device access to specified administrative area information. This function can be executed only by the program for apparatus management 201 designated by the 1st process information 221 belonging to the administrative area information for management 231. That is, the manager authorization is given only to the data center manager.

When access from the application program to the device is requested, the permitted device decision program 213 refers to the administrative area information, to which belongs the process information designating the application program which has required the access. When the device to be accessed is not access permitted by the application program, the access to the device is failed.

The file system processing program 214 manages data arrangement on the disk and can provide the name space of a tree structure using a disk area and store a file. In the name space, the root of a tree called a root directory is expressed as "/" which is a start point for searching a file name. It also has the knot of a tree called a directory having a name and the leaf of a tree called a file having a name. The directory stores a subordinate directory and a file name and uses "/" as the separator between directories. The name of the tree structure generated on plural disks can connect one of the roots to the knot by mount operation. The administrative area information 231 to 233 has a mount table of the file system and can change part of the tree for each administrative area information. When generating administrative area information, the root directory of administrative area information generated can be changed to the specified directory. Files other than the specified directory cannot be accessed from the application program designated by the process information belonging to the administrative area information.

The storage I/O processing program 215 performs input/output from/to the 1st disk 151 to the 3rd disk 153 and the tape device 154 connected to the storage I/F 131. The application program designated by the process information which requests input and output performs an open processing program of the storage device in the storage I/O processing program to obtain a handle used in the later processing. The open processing program calls the permitted device decision program 213 to check that the specified device is access permitted. When it is not access permitted, the open processing program cannot be done so that the access to the device is failed.

The network I/O processing program 216 performs communication between the information processor 101 and the LANs 141 to 143 via the network I/F 121 to 123. The network I/F 121 to 123 must receive data when there is no request of the application program designated by the process information. It describes to the network I/F information 241 to 243 which administrative area information is handed the data. In FIGS. 1 and 2, the network I/F 121 to 123 different for each administrative area information are provided. A tagged VLAN function defined by IEEE802.1Q is used to employ logical network I/F for each tag number, and then, the network I/F information 241 to 243 for each of the logical network I/F are prepared to share physical network I/F. The logical network I/F duplicating received data is used to prepare the network I/F information 241 to 243 for each of the logical network I/F to provide plural of administrative area information on the same segment.

Figure 3:
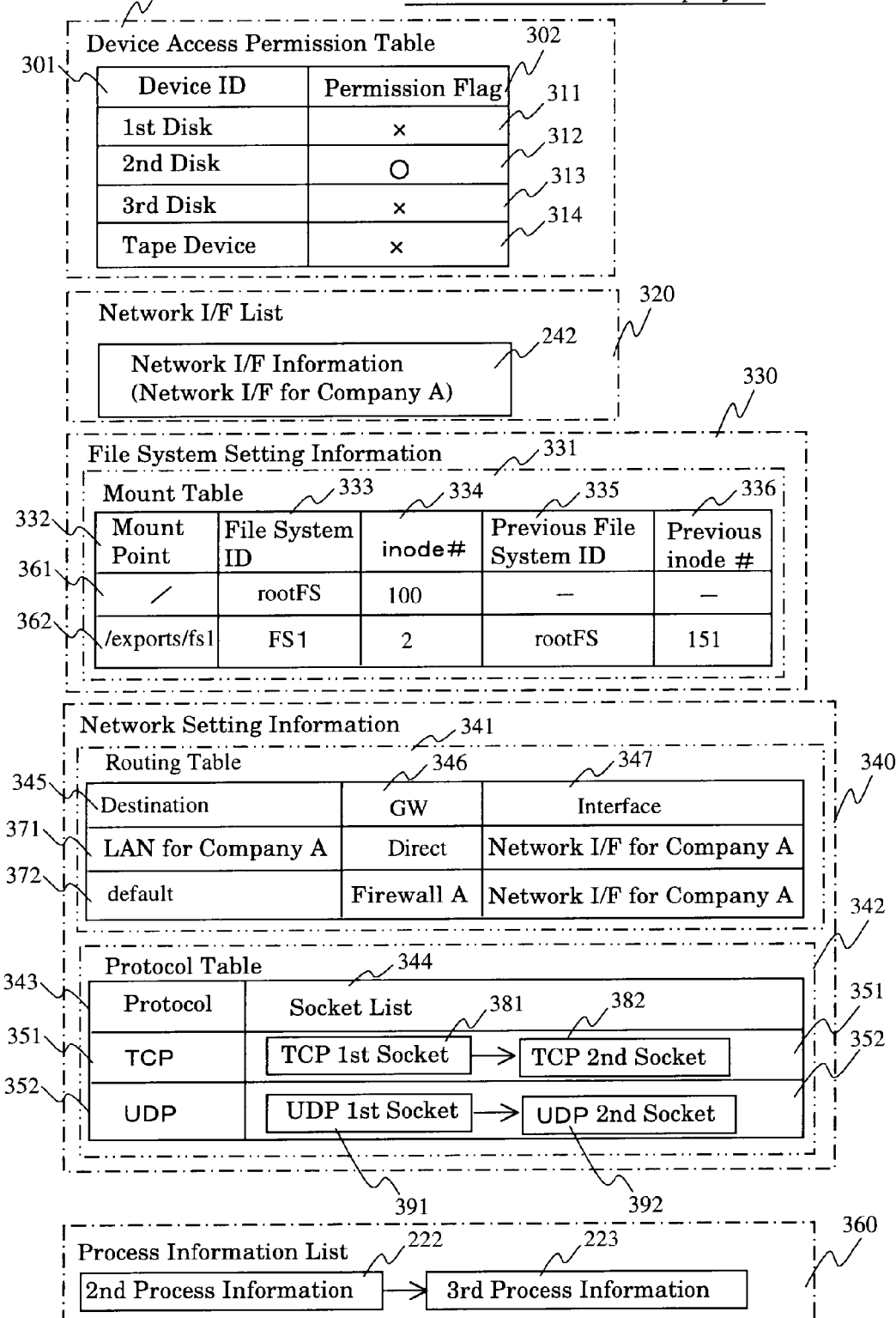
FIG. 3 is a diagram showing the detail of a specific example of administrative area information by taking administrative area information for company A 232 as an example.

FIG. 3 is a diagram showing the detail of a specific example of administrative area information by taking the administrative area information for company A 232 as an example. The administrative area information for company A 232 has a device access permission table 300, a network I/F list 320, file system setting information 330, network setting information 340 and a process information list 360.

The device access permission table 300 shows the correspondence between a field 301 storing a device ID and a field 302 storing a permission flag. For example, from rows 311, 313, access to the 1st disk and the 3rd disk is not permitted. From a row 312, access to the 2nd disk is permitted. From a row 314, access to the tape device is not permitted. The information is set when the process information generating program 211 generates administrative area information and is changed by the administrative area information change processing program 212.

The network I/F list 320 registers the network I/F information for company A 242 storing information for communication between the information processor 101 and the network I/F 122 under the administrative area information for company A 232. The information is set when the process information generating program 211 generates administrative area information and is changed by the administrative area information change processing program 212.

The file system setting information 330 stores a mount table 331 defining a name space used by the administrative area information for company A 232. The mount table 331 has fields storing a mount point 332, a file system ID 333, inode # 334, a previous file system ID 335 to which a directory before mounting belongs and a previous inode # 336 showing a directory before mounting. "/" shown in a row 361 is a root directory of the administrative area information for company A 232 which is #100 inode of root FS so as to express the absence of the previous file system ID and the previous inode # as "-". The root FS is a file system generated on the 1st disk 151 and the #100 inode is a directory of "/env1". A row 362 shows that the application program designated by the process information belonging to the administrative area information for company A 232 connects (mounts) #2 inode of the file system ID of FS1 to the "/exports/fs1" directory. The FS1 is a file system generated on the 2nd disk 152 and the #2 inode is a "/" root directory. Of the information, the "/" shown in the row 361 is set when the process information generating program 211 generates administrative area information. Others are set by mount operation performed by the application program designated by the process information belonging to the administrative area information for company A 232.

The network setting information 340 has a routing table 341 and a protocol table 342. The routing table 341 has a field storing destination, a field 347 storing information showing which interface is used, and a field 346 storing information showing where to send data, and shows, for each of the destinations 345, which interface 347 is used and where (GW) 346 to send data. The entry shown in a row 371 shows that when data is sent to the party on the other end on the LAN for company A 142, the network I/F for company A 122 may be used to send it directly to a destination address. The entry shown in a row 372 shows that when data is sent to other parties on the other end, the network I/F for company A 122 may be used to sent it to the firewall A 144. The protocol table 342 has a socket list 344 for each protocol 343 and is used for waiting for received data. The entry shown in a row 351 shows that sockets 381, 382 corresponding to ports provided by the program designated by the process information are connected by the TCP protocol. Similarly, The entry shown in a row 352 shows that sockets 391, 392 corresponding to ports provided by the program designated by the process information are connected by the UDP protocol. The information is empty when generating administrative area information. All of the information are set by the application program designated by the 2nd process information 222 or the 3rd process information 223 belonging to the administrative area information for company A 232.

The process information list 360 registers a list of the process information belonging to the administrative area information for company A 232. It shows that the 2nd process information 222 and the 3rd process information 223 belong to the administrative area information for company A 232. As the information, registered is the process information generated by the process information generating program 211 when generating administrative area information. When the application program designated by the process information belonging to the administrative area information for company A 232 generates new process information, the administrative area information is added.

Figure 4:
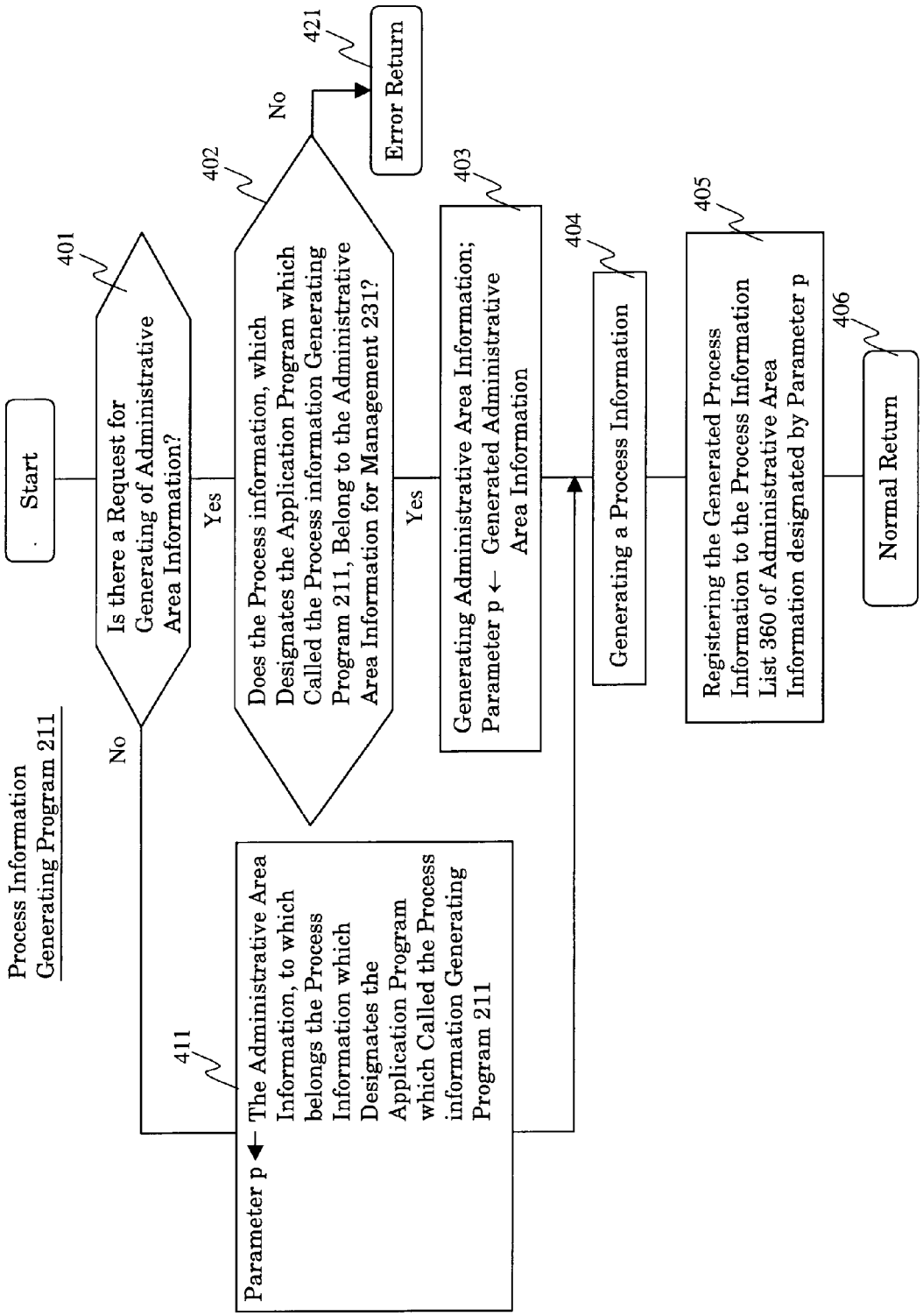
FIG. 4 is a diagram showing the processing flow of a process information generating program 211.

FIG. 4 is a diagram showing the processing flow of the process information generating program 211. In step 401, the process information generating program 211 decides whether the application program to operate the process information generating program 211 includes a request for generating of administrative area information. In the case of the call including the request for generating of administrative area information, the routine is advanced to step 402. In the case of the call not including the request for generating of administrative area information, the routine is advanced to step 411. In step 411, the pointer designating the administrative area information, to which belongs the process information which designates the application program to operate the process information generating program 211 is substituted into a parameter p and the routine is advanced to step 404. In step 402, decided is whether the process information which designates the application program to operate the process information generating program 211 belongs to the administrative area information for management 231. When it belongs to the administrative area information for management 231, the routine is advanced to step 403. When it does not belong to the administrative area information for management 231, the routine is advanced to step 421. In step 421, error retune is performed. In step 403, new administrative area information is generated to reflect access permission to the specified device and information of the network I/F and the root directory onto the administrative area information for management 231. Then, the pointer to the generated administrative area information is substituted into the parameter p and the routine is advanced to step 404. In step 404, process information is generated. In step 405, the generated process information is registered to the process information list 360 of administrative area information designated by the parameter p. In step 406, normal return is performed.

The process information generating program 211 provides the following interface.
[Function] create_process (cmd, dir, netif, dev),
[Argument] cmd: Start command
  dir: Specifying the root directory of administrative area information generated
  netif: A list of network interfaces registered to administrative area information
  dev: A list of access permitted devices
[Explanation] At calling without dir, netif and dev, the application program designated by the process information specified to cmd in the same administrative area information as the calling process information is started. When specifying any one of dir, netif and dev, administrative area information specified by dir, netif or dev is generated to start the application program designated by the process information specified to cmd in the generated administrative area information.

The user can use a command having the following interface to operate the process information generating program 211.
[Command form] newenv command name root directory network interface name device name
[Argument] Command name: Start command
Root directory: Specifying the root directory of administrative area information generated
Network interface name: Plural network interface names registered to administrative area information can be specified.
Device name: Plural access permitted device names can be specified.
[Explanation] Administrative area information specified by the root directory, network interface name and device name is generated to start the application program designated by the process information specified by the command name operated in the administrative area information.

In place of the permitted device, an interface having, as an argument, an access prohibited device can be provided.

Figure 5:
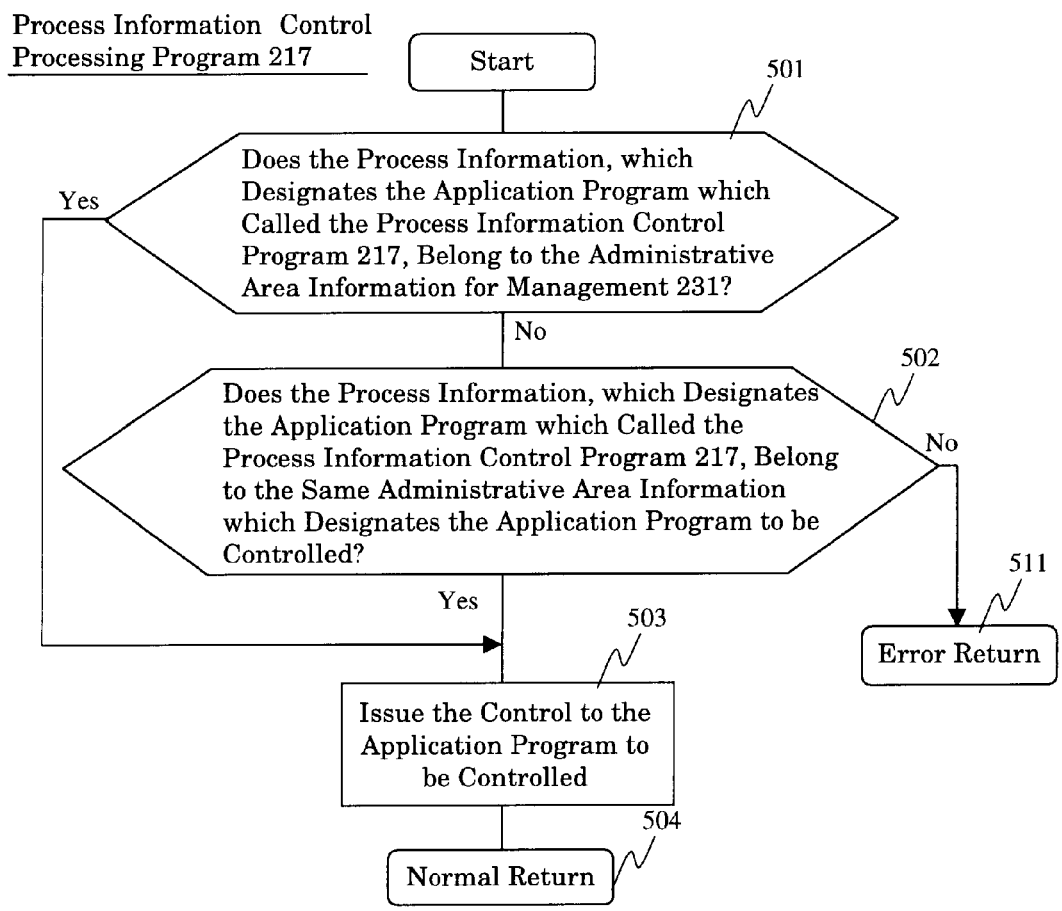
FIG. 5 is a diagram showing the processing flow of a process information control processing program 217.

FIG. 5 is a diagram showing the processing flow of the process information control processing program 217. In step 501, the process information control processing program 217 decides whether the process information which designates the application program to operate the process information control processing program 217 belongs to the administrative area information for management 231. When it belongs to the administrative area information for management 231, the routine is advanced to step 503. When it does not belong to the administrative area information for management 231, the routine is advanced to step 502. In step 502, decided is whether the process information which designates the application program to operate the process information control processing program 217 belongs to the same administrative area information which designates the application program to be controlled. When it belongs to the same administrative area information, the routine is advanced to step 503. When it does not belong to the same administrative area information, the routine is advanced to step 511. In step 511, error return is performed. In step 503, the control of stop, termination and restart is issued to the application program to be controlled and the routine is advanced to step 504. In step 504, normal return is performed.

Figure 6:
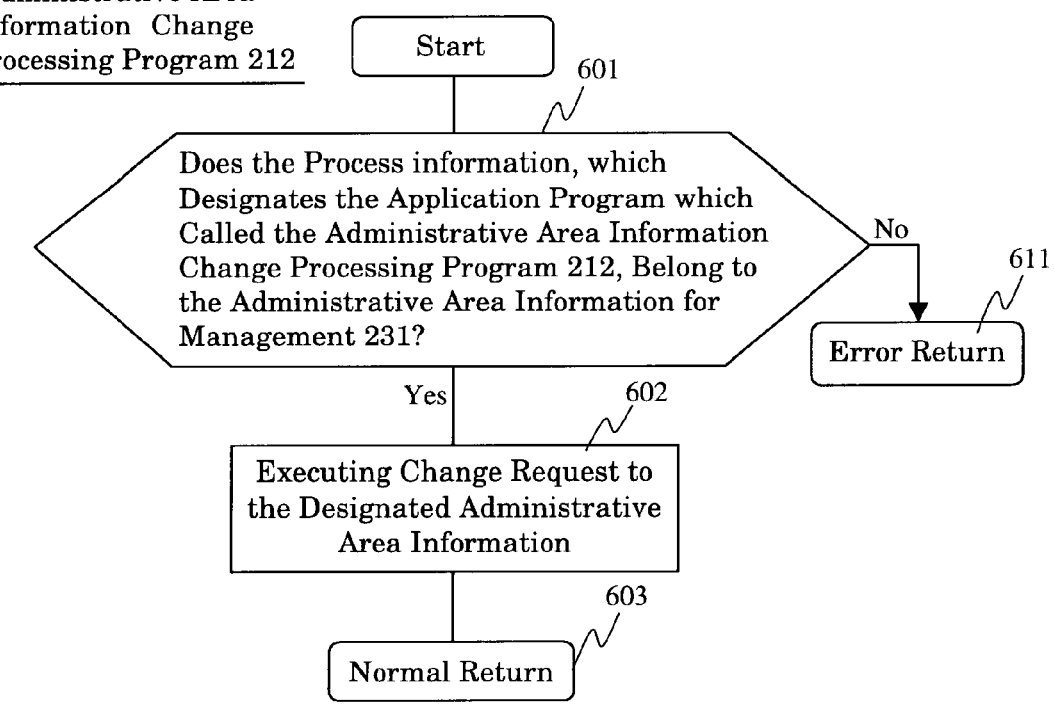
FIG. 6 is a diagram showing the processing flow of an administrative area information change processing program 212.

FIG. 6 is a diagram showing the processing flow of the administrative area information change processing program 212. In step 601, the administrative area information change processing program 212 decides whether the process information which designates the application program to operate the administrative area information change processing program 212 belongs to the administrative area information for management 231. When it belongs to the administrative area information for management 231, the routine is advanced to step 602. When it does not belong to the administrative area information for management 231, the routine is advanced to step 611. In step 611, error return is performed. In step 602, change to the designated administrative area information is executed and the routine is advanced to step 603. In step 603, normal return is performed. That is, the processing changing the administrative area information can be executed only from the PC for data center manager 147 via the program for apparatus management 201 designated by the process information belonging to the administrative area information for management 231.

Figure 7:
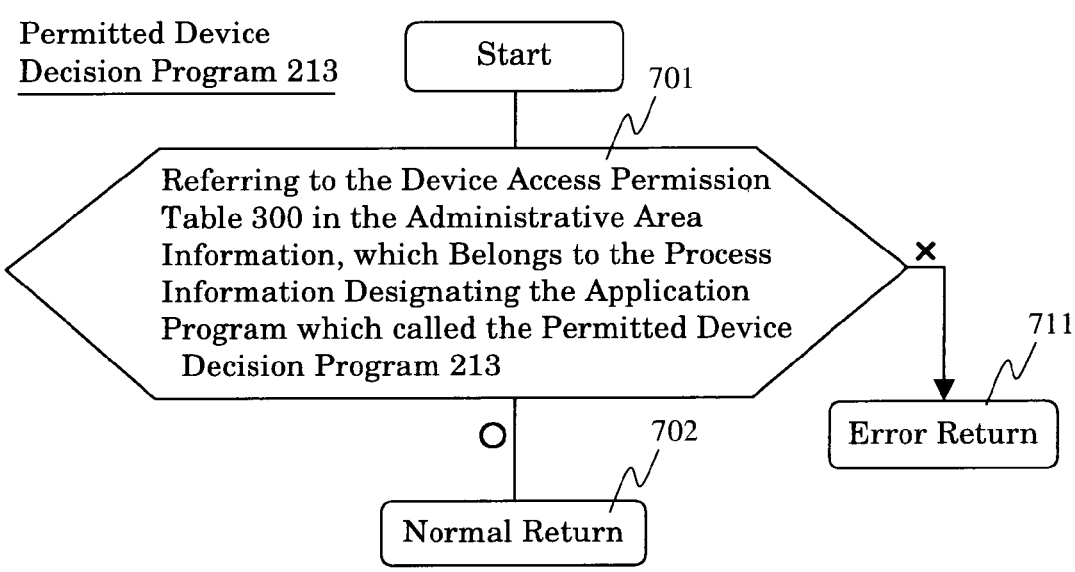
FIG. 7 is a diagram showing the processing flow of a permitted device decision program 213.

FIG. 7 is a diagram showing the processing flow of the permitted device decision program 213. In step 701, the permitted device decision program 213 refers to the entry designating the specified device of the device access permission table 300 in the administrative area information, to which belongs the process information designating the application program to operate the permitted device decision program 213 so as to decide the value of the permission fag 302. In the case of "○", the routine is advanced to step 702. In step 702, normal return is performed. In the case of "x", the routine is advanced to step 711. In step 711, error return is performed.

Figure 8:
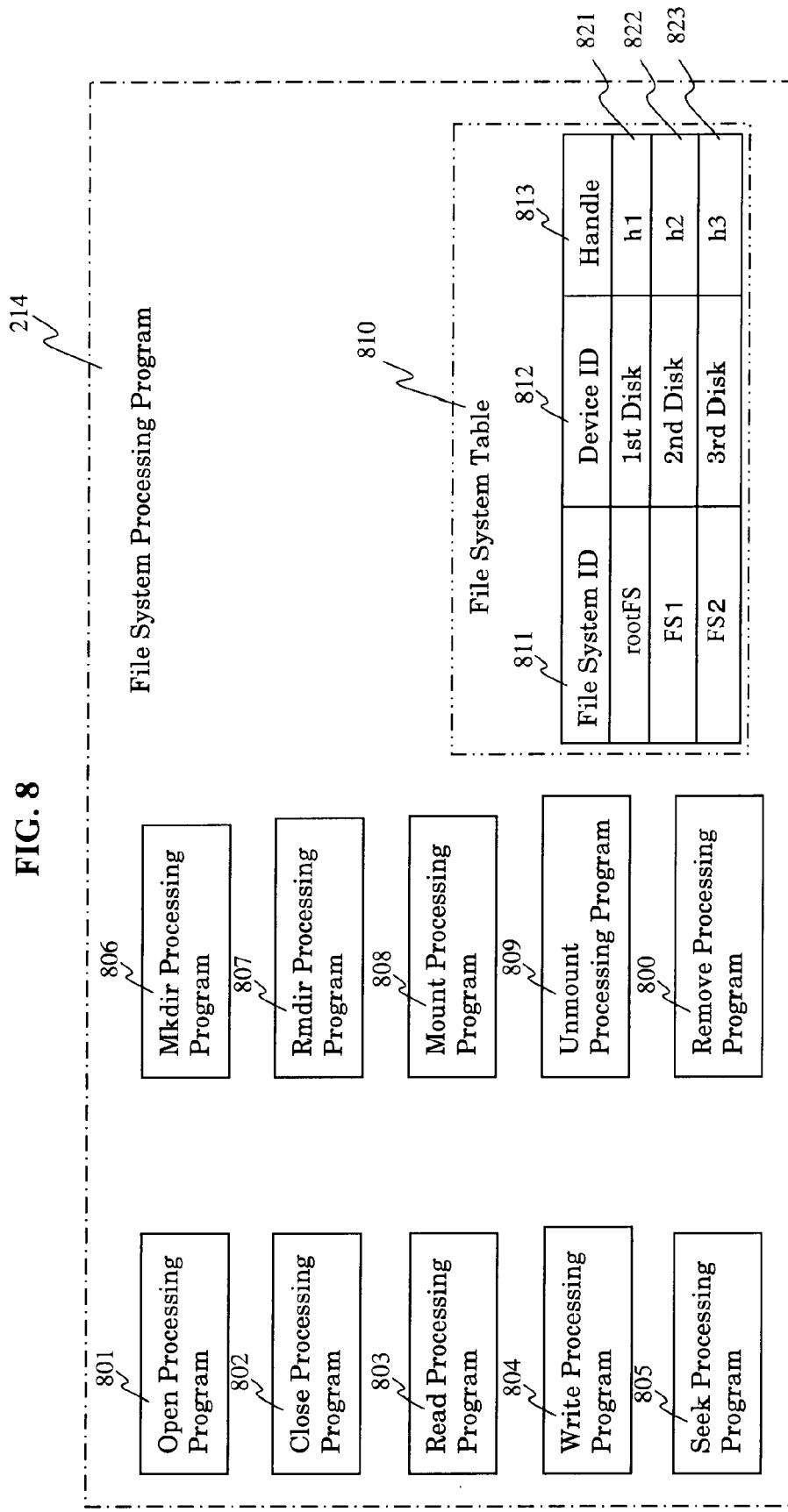
FIG. 8 is a diagram showing processing functions and data structures of a file system processing program 214.

FIG. 8 is a diagram showing processing programs and data structures of the file system processing program 214. The file system processing program 214 has an open processing program 801, a close processing program 802, a read processing program 803, a write processing program 804, a seek processing program 805, an mkdir processing program 806, an rmdir processing program 807, a mount processing program 808, a umount processing program 809, a remove processing program 800 and a file system table 810.

The open processing program 801 performs processing to obtain the access right of the specified file. The close processing program 802 performs processing to abandon the access right. The read processing program 803 performs processing to read data from the file which obtains the access right in the open processing program. The write processing program 804 performs processing to write data into the file which obtains the access right in the open processing program. The seek processing program 805 performs processing to change the position on the file for the next read and write to the file which obtains the access right in the open processing program. The mkdir processing program 806 performs processing to create a new directory. The rmdir processing program 807 perform processing to delete the specified directory. The mount processing program 808 performs processing to connect the file system on the specified disk onto a name space. The umount processing program 809 performs processing to release the mount of the file system. The remove processing program 800 performs processing to delete the specified file.

The file system table 810 shows the mounted file system. The numeral 811 denotes a field of a file system ID. The numeral 812 denotes a field of a device ID, The numeral 813 denotes a field of a handle. The entry shown in a row 821 indicates that a file system having an ID of root FS is generated on the 1st disk 151 to hold a handle h1 for accessing the 1st disk 151 via the storage I/O processing program 215. The entry shown in a row 822 indicates that a file system having an ID of FS1 is generated on the 2nd disk 152 to hold a handle h2 for accessing the 2nd disk 152 via the storage I/O processing program 215. The entry shown in a row 823 indicates that a file system having an ID of FS2 is generated on the 3rd disk 153 to hold a handle h3 for accessing the 3rd disk 153 via the storage I/O processing program 215.

FIG. 9 is a diagram showing the processing flow of the mount processing program 808 including device allocation of the processing programs of the file system processing program 214. In step 901, the mount processing program 808 calls the permitted device decision program 213 to check the access right of the device specified to mount. In step 902, as the result of checking of the access right of step 901, when the requested device access is permitted, the routine is advanced to step 903. When the requested device access is not permitted, the routine is advanced to step 911. In step 911, error return is performed. In step 903, the storage I/O processing program 215 is called to open the requested device. That is, a handle for accessing the device is obtained. In step 904, an entry of the handle obtained in step 903 is added to the file system table 810. In step 905, an entry is added to the mount table 331 of the administrative area information, to which belongs the process information which designates the application program to operate the file system processing program 214. In step 906, normal return is performed.

Figure 10:
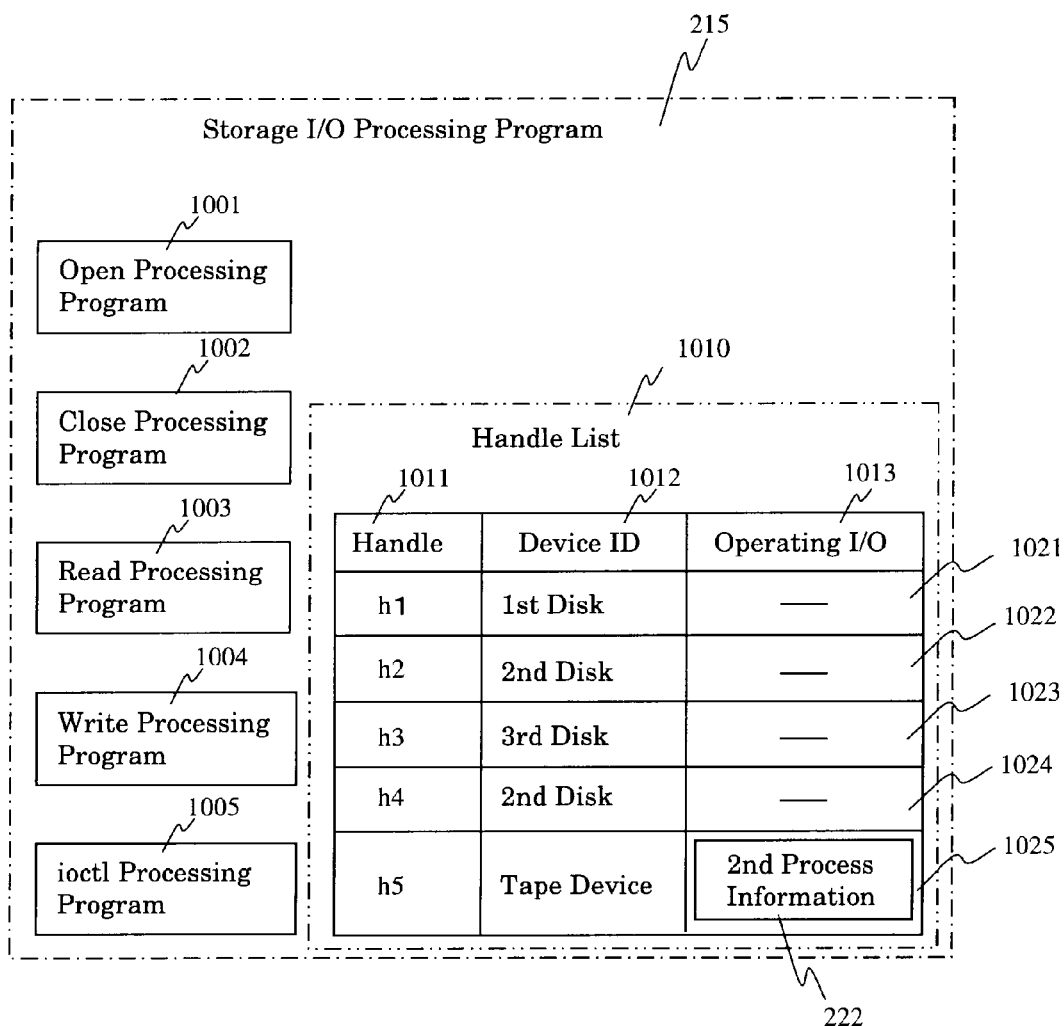
FIG. 10 is a diagram showing processing functions and data structures of a storage I/O processing program 215.

FIG. 10 is a diagram showing processing programs and data structures of the storage I/O processing program 215. The storage I/O processing program 215 has an open processing program 1001, a close processing program 1002, a read processing program 1003, a write processing program 1004, an ioctl processing program 1005 and a handle list 1010.

The open processing program 1001 decides whether access to the specified device is permitted and gives a handle used in the later processing when the access is permitted. The close processing program 1002 makes an unnecessary handle invalid. The read processing program 1003 reads data from the specified device when the handle is obtained by the open processing program 1001. The write processing program 1004 writes data into the specified device when the handle is obtained by the open processing program 1001. The ioctl processing program 1005 performs device inherent operation to the specified device when the handle is obtained by the open processing program 1001.

The handle list 1010 shows a list of the handles given by the storage I/O processing program 215. The handle list 1010 has a field 1011 of a handle, a field 1012 of a device ID, and a field 1013 of operating I/O. The entry shown in a row 1021 indicates that a handle h1 is used to perform access to the 1st disk 151 and the operating I/O is absent ("-"). A row 1022 indicates that a handle h2 is used to perform access to the 2nd disk 152 and the operating I/O is absent ("-"). A row 1023 indicates that a handle h3 is used to perform access to the 3rd disk 153 and the operating I/O is absent. A row 1024 indicates that a handle h4 is used to perform access to the 2nd disk 152 and the operating I/O is absent. A row 1025 indicates that a handle h5 is used to perform access to the tape device 154, the operating I/O is I/O to the tape device 154, and the program for company A management 202 designated by the 2nd process information 222 waits for completion of the I/O operation.

Figure 11:
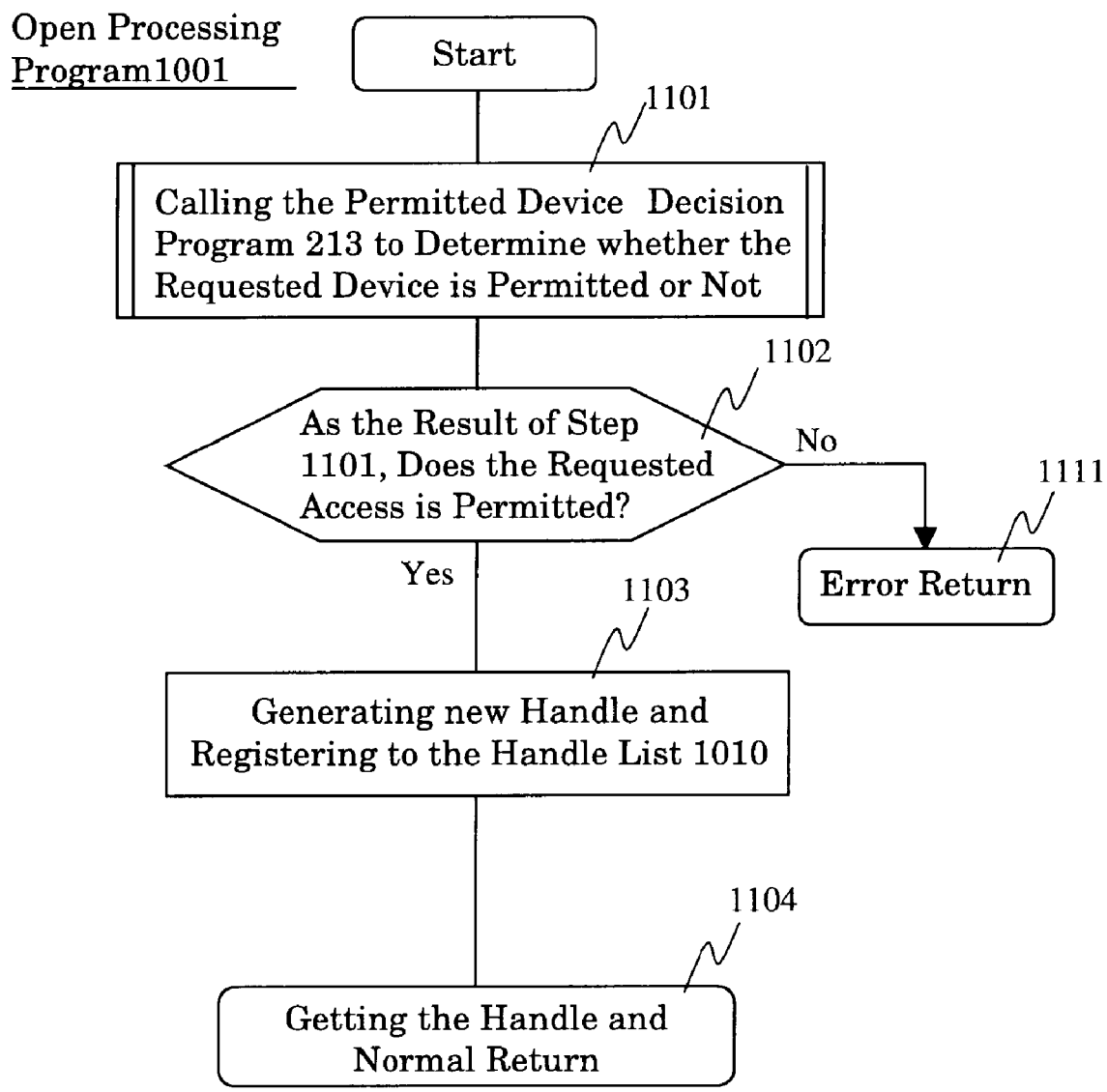
FIG. 11 is a diagram showing the processing flow of an open processing program 1001 deciding device access permission of the storage I/O processing program 215.

FIG. 11 is a diagram showing the processing flow of the open processing program 1001 deciding the access permission of the device of the storage I/O processing program 215. In step 1101, the open processing program 1001 calls the permitted device decision program 213 to check the access right of the specified device. In step 1102, as the result of checking of the access right of step 1101, when the requested access is permitted, the routine is advanced to step 1103 and, when the requested access is not permitted, the routine is advanced to step 1111. In step 1111, error return is performed. In step 1103, a new handle to the specified device is generated to register a new entry to the handle list 1010. In step 1104, getting the handle, normal return is performed.

Figure 12:
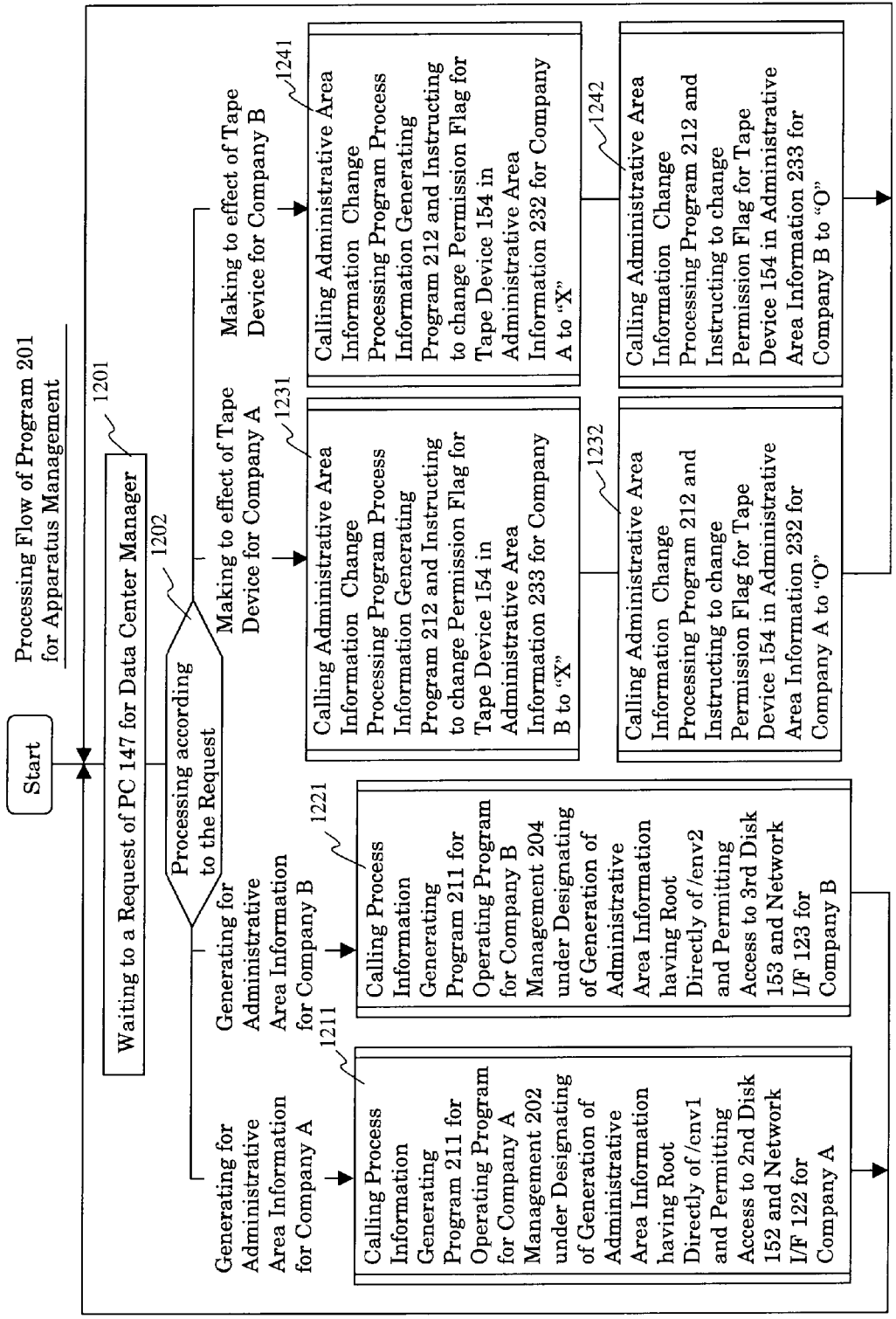
FIG. 12 is a diagram showing the processing flow of a program for apparatus management 201 operated on the information processor 101.

FIG. 12 is a diagram showing the processing flow of the program 201 for apparatus management operated on the information processor 101. The program for apparatus management 201 waits for a request of the PC for data center manager 147 in step 1201. When the request of the PC for data center manager 147 reaches, the routine is advanced to step 1202 to decide the contents of the process request. When the request is "generating for administrative area information for company A", the routine is advanced to step 1211. When the request is "generating for administrative area information for company B", the routine is advanced to step 1212. When the request is "making to effect of tape device for company A", the routine is advanced to step 1231. When the request is "making to effect of tape device for company B", the routine is advanced to step 1241.

In step 1211, to generate administrative area information of the file server program for company A 203, called is the process information generating program 211 for operating the program for company A management 202 under designating of generation of administrative area information having root directory of "/env1" to separate the accessible directory and permitting access to the 2nd disk 152 and the network I/F for company A 122 provided to the company A. This generates the administrative area information for company A 232 executing the file server program for company A 203 to start the application program designated by the first process information operated under the administrative area information for company A 232.

In step 1221, to generate administrative area information of the file server program for company B 205, called is the process information generating program 211 for operating the program for company B management 204 under designating of generation of administrative area information having root directory of "/env2" to separate the accessible directory and permitting access to the 3rd disk 153 and the network I/F 123 for company B provided to the company B. This generates the administrative area information for company B 233 executing the file server program for company B 205 to start the application program designated by the first process information operated under the administrative area information for company B 233.

In step 1231, the permission of the tape device 154 is instructed to be cancelled from the administrative area information for company B 233, calling the administrative area information change processing program 212. In step 1232, the administrative area information for company A 232 is specified to permit access of the tape device 154, calling the administrative area information change processing program 212. This can use the tape device 154 from the 3rd process information 223 under the administrative area information for company A 232.

In step 1241, the permission of the tape device 154 is instructed to be cancelled from the administrative area information for company A 232, calling the administrative area information change processing program 212. In step 1242, the administrative area information for company B 233 is specified to permit access of the tape device 154, calling the administrative area information change processing program 212. This can use the tape device 154 from the 5th process information 225 under the administrative area information for company B 233.

The permission of the tape device 154 to the administrative area information for company A 232 and the administrative area information for company B 233 in steps 1231 and 1241 is performed in different time based on the respective agreements.

When the processing of steps 1211, 1221, 1232 and 1242 is completed, the routine is returned to step 1201 to wait for the next processing request.

Figure 13:
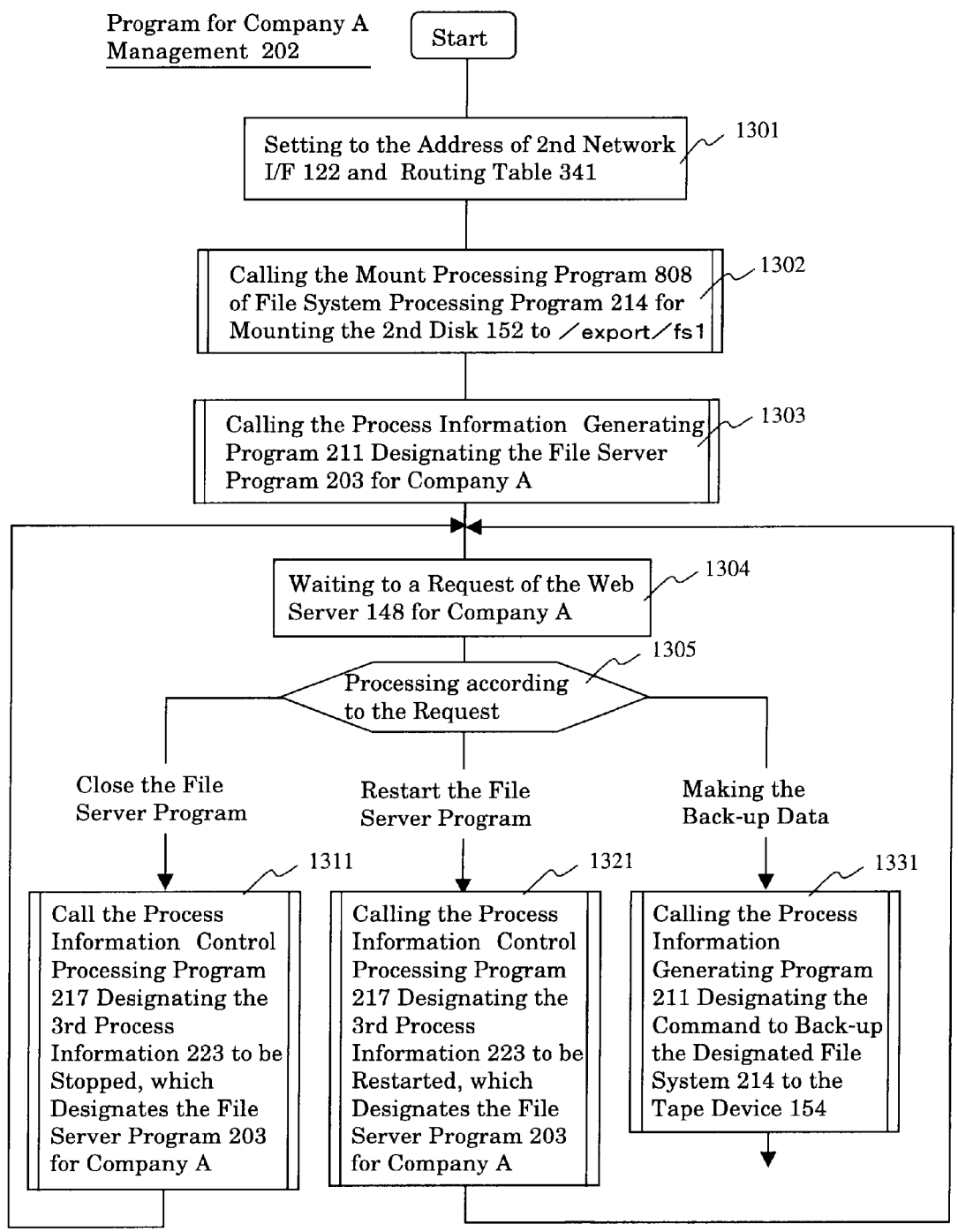
FIG. 13 is a diagram showing the processing flow of a program for company A management 202 operated on the information processor 101.

FIG. 13 is a diagram showing the processing flow of the program for company A management 202 operated on the information processor 101. To start generating of server administrative area information for company A in step 1211 of the program for apparatus management 201, the process information generating program 211 is called to start the program for company A management 202. According to this, the program for company A management 202 is started. In step 1301, setting to the address of the network I/F for company A 122 and routing table is performed. In step 1302, the mount processing program 808 of the file system processing program 214 is called for mounting the 2nd disk to "/exports/fs1". In step 1303, called is the process information generating program 211 designating the file server program for company A 203. This starts execution of the file server program for company A 203 under the administrative area information for company A 232. The file server program for company A 203 releases "/exports/fs1" to provide the file sharing service to the Web server for company A 148.

In step 1304, a request of the Web server for company A 148 is waited. When the request of the Web server for company A 148 reaches, the routine is advanced to step 1305 to perform processing according to the request. When the request is "Close the file server program", the routine is advanced to step 1311. When the request is "Restart the file server program", the routine is advanced to step 1321. When the request is "Making the back-up data", the routine is advanced to step 1331.

In step 1311, there is called the process information control processing program 217 designating the 3rd process information 223 to be stopped, which designates the file server program for company A 203. This stops the activity of the file server program for company A 203. In step 1321, there is called the process information control processing program 217 designating the 3rd process information 223 to be restarted, which designates the file server program for company A 203. This restarts the stopped activity of the file server program for company A 203. In step 1331, there is called the process information generating program 211 designating the command to back-up the file below "/exports/fs1" to the tape device 154. Under the administrative area information for company A 232, the back-up command is started to send the file below the specified directory to the tape device 154 for back-up.

The processing of steps 1301 to 1303 is executed each time new administrative area information is generated in step 1211 of the program for apparatus management 201 shown in FIG. 12 to call the process information generating program for starting the program for company A management 202.

The processing flow of the program for company A management 202 shown in FIG. 13 and the processing of the file server program for company A 203 are the same in the program for company B management 204 and the file server program for company B 205.

The virtual server function operated under the administrative area information of the described Embodiment 1 can be used in, other than the file server shown here, the NIS server, the DNS server, the LDAP server, the Web server, the Proxy server, a combination of the servers. Addition of the process according to the request performed in step 1305 will not affect the present invention. For example, addition of processing to change the file server sharing setting is easy.

In Embodiment 1, the 1st disk 151 to the 3rd disk 153 are handled as physical devices. Using a partition function partitioning a single disk, the partitions can be handled as logically other disks (logical volumes). As the RAID device, when plural physical devices are isolated logically to be virtualized as logical devices, the logical devices can be handled other disks. This is the same for the case of partitioning the logical device. Corresponding to such processing, the expression method of the device ID 301 of the device access permission table 300 of the administrative area information for company A 232 shown in FIG. 3 is changed.

Embodiment II

In Embodiment 1, as shown in FIG. 4, the directory is specified as information of the root directory of the administrative area information generated in the interface of the process information generating program 211. This may be replaced with one which specifies the device name storing a file system mounted.

Figure 14:
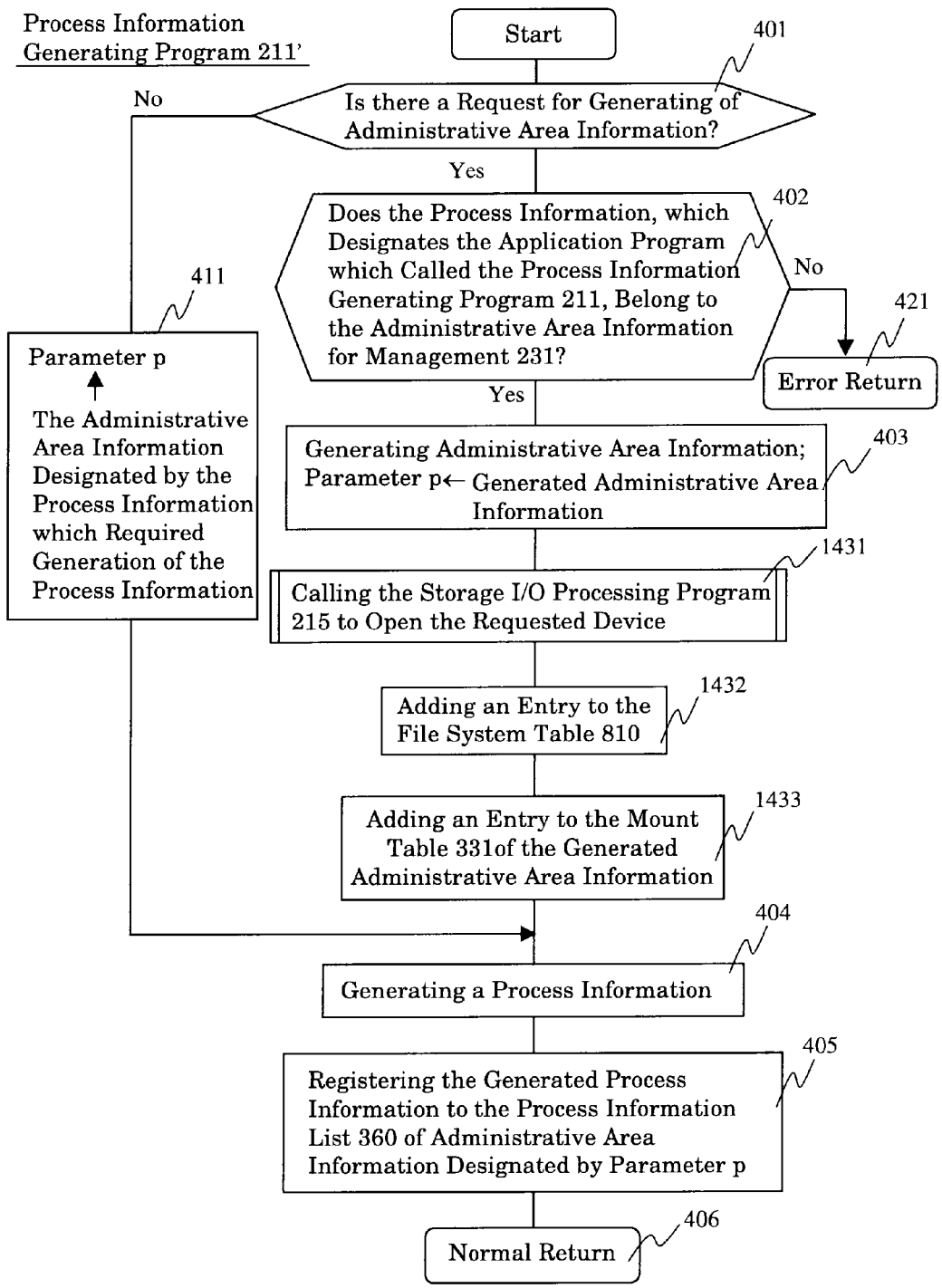
FIG. 14 is a diagram showing the processing flow of a process information generating program 211' having a function mounting a root file system when administrative area information is generated in the process information generating program.

FIG. 14 is a diagram showing the processing flow of a process information generating program 211' having a function mounting a root file system when generating administrative area information in the process information generating program. Steps having the same function as that of the steps shown in FIG. 4 are indicated by the same numerals.

In step 401, whether the application program calling the process information generating program 211' includes a request for generating of administrative area information is decided. In the case of the call including the request for generating of administrative area information, the routine is advanced to step 402. In the case of the call not including the request for generating of administrative area information, the routine is advanced to step 411. In step 411, the pointer designating the administrative area information, to which belongs the process information which designates the application program to operate the process information generating program 211' is substituted into a parameter p and the routine is advanced to step 404. In step 402, decided is whether the process information which designates the application program to operate the process information generating program 211' belongs to the administrative area information for management 231. When it belongs to the administrative area information for management 231, the routine is advanced to step 403. When it does not belong to the administrative area information for management 231, the routine is advanced to step 421. In step 421, error retune is performed. In step 403, new administrative area information is generated to reflect access permission to the specified device and information of the network I/F and the root directory onto the administrative area information for management 231. Then, the pointer to the generated administrative area information is substituted into the parameter p and the routine is advanced to step 1431. In step 1431, the storage I/O processing program 215 is called to obtain a handle. In step 1432, an entry is added to the file system table 810. In step 1433, an entry is added to the mount table 331 of the administrative area information generated in step 1403. The routine is advanced to step 404. In step 404, process information is generated. In step 405, the generated process information is registered to the process information list 360 of the administrative area information designated by the parameter p. In step 406, normal return is performed.

The process information generating program 211' provides the following interface.

[Function] create_processwith_mount (cmd, rdev, netif, dev),

[Argument] cmd: Start command rdev: Specifying the device storing the file system mounted to the root directory of the administrative area information generated netif: A list of network interfaces registered to administrative area information dev: A list of access permitted devices

[Explanation] At calling without rdev, netif and dev, the application program designated by the process information specified to cmd in the same administrative area information as the calling process information is started. When specifying any one of rdev, netif and dev, administrative area information specified by rdev, netif or dev is generated to start the application program designated by the process information specified to cmd in the generated administrative area information.

The user uses a command having the following interface to call the process information generating program 211'.

[Command form] newenv_mount command name root device name network interface name device name

[Argument] Command name: Start command

Root device name: Specifying the device name storing the file system mounted to the root directory of the administrative area information generated Network interface name: Plural network interface names registered to administrative area information can be specified.

Device name: Plural access permitted device names can be specified.

[Explanation] Administrative area information specified by the root device name, network interface name and device name is generated to start the application program designated by the process information specified by the command name operated in the administrative area information.

In place of the permitted device, an interface having, as an argument, a device prohibiting access can be provided.

In the administrative area information generated by mounting the root directory by the process information generating program 211', the root directory can be independent from other administrative area information including the administrative area information for management 231.

In the present invention, the manager authentication cannot access other devices and file systems exceeding the range specified by the administrative area information operating the application program designated by process information limited by administrative area information. The manager authentication is thus given to each administrative area information. The manager for each administrative area information can freely perform mount/unmount of the file system, back-up and change of the sharing setting of the network file system in a given range.

What is claimed is:

1. A real server coupled to a plurality of computers and a tape device, comprising:
 a processor configured to make a plurality of virtual servers on an operating system, the operating system executing processes for each of the plurality of virtual servers,
 wherein each of the plurality of virtual servers receives a file access request from one of the plurality of computers based on access permission information, the access permission information being set with respect to each of the plurality of virtual servers, and each of the plurality of virtual servers responds to the file access request; and
 an apparatus manager executed by the processor,
 wherein the apparatus manager is configured to generate and delete each of the plurality of virtual servers, and configured to permit or forbid each of the plurality of virtual servers access to the tape device coupled to the real server,
 wherein the apparatus manager determines whether a first virtual server of the plurality of the virtual servers is permitted to access the tape device, if the processor receives a backup request of data managed by the first virtual server from a first one of the plurality of computers that is permitted to access the first virtual server, and
 wherein the processor backs up the data to the tape device, if the first server is permitted to access the tape device.

2. The real server according to claim 1, wherein when the tape device is prohibited from the first virtual server, the apparatus manager permits access to the tape device for the first virtual server after canceling permission of access of the tape device.

3. The real server according to claim 1, wherein when the apparatus manager permits access to the tape device for the first virtual server, the apparatus manager cancels the permission and permits access to the tape device for a second virtual server of the plurality of the virtual servers.

4. A real server coupled to a plurality of computers comprising:
 a processor configured to make a plurality of virtual servers on an operating system, the operating system executing processes for each of the plurality of virtual servers,
 wherein each of the plurality of virtual servers receives a file access request from one of the plurality of computers based on access permission information, the access permission information being set with respect to each of the plurality of virtual servers, and each of the plurality of virtual servers responds to the file access request;
 a memory storing routing information and mount information;
 a storage device comprising a file system mounted on a root directory of a corresponding virtual server; and
 an apparatus manager executed by the processor,
 wherein the apparatus manager is configured to generate and delete each of the plurality of virtual servers, and configured to permit or forbid each of the plurality of virtual servers access to a tape device coupled to the real server,
 wherein the apparatus manager determines whether a first virtual server of the plurality of the virtual servers is permitted to access the tape device, if the processor receives a backup request of data managed by the first virtual server from a first one of the plurality of computers that is permitted to access the first virtual server,
 wherein the processor backs up the data to the tape device, if the first server is permitted to access the tape device, and
 wherein the processor sets the routing information, mounts the storage device based on the mount information, and provides a shared file server to the plurality of computers.

5. The real server according to claim 4, wherein when the apparatus manager receives a request for making back-up data, the apparatus manager makes the back-up data of the shared file server to the tape device.

6. The real server according to claim 4, wherein when the apparatus manager receives a request to close the shared file server, the apparatus manager closes the shared file server.

7. The real server according to claim 4, wherein when the apparatus manager receives a request to restart the shared file server, the apparatus manager restarts the shared file server.

8. A real server coupled to a plurality of computers comprising:
 a processor configured to make a plurality of virtual servers on an operating system, the operating system executing processes for each of the plurality of virtual servers,
 wherein each of the plurality of virtual servers receives a file access request from one of the plurality of computers based on access permission information, the access permission information being set with respect to each of the plurality of virtual servers, and each of the plurality of virtual servers responds to the file access request; and
 an apparatus manager executed by the processor,
 wherein the apparatus manager is configured to generate and delete each of the plurality of virtual servers, and configured to permit or forbid each of the plurality of virtual servers access to a tape device coupled to the real server,
 wherein the apparatus manager determines whether a first virtual server of the plurality of the virtual servers is permitted to access the tape device, if the processor receives a backup request of data managed by the first virtual server from a first one of the plurality of computers that is permitted to access the first virtual server, wherein the processor backs up the data to the tape device,
if the first server is permitted to access the tape device,
and wherein the plurality of virtual servers perform as at least one of a NIS (Network Information Server), a DNS (Domain Name System) server, a LDAP (Lightweight Directory Access Protocol) server, a Web server, or a proxy server.

9. A method of managing a plurality of virtual servers, the method being implemented in a real server coupled to a plurality of computers and a tape device, the real server comprising a processor and an apparatus manager executed by the processor, the method comprising:

configuring, by the processor, the plurality of virtual servers, wherein an operating system executes processes for each of the plurality of virtual servers;

receiving, by each of the plurality of virtual servers, a file access request from one of the plurality of computers based on access permission information, the access permission information being set with respect to each of the plurality of virtual servers, and responding, by each of the plurality of virtual servers, to the file access request, wherein the apparatus manager is configured to generate and delete each of the plurality of virtual servers, and configured to permit or forbid each of the plurality of virtual servers access to the tape device coupled to the real server, wherein the apparatus manager determines whether a first virtual server of the plurality of the virtual servers is permitted to access the tape device, if the processor receives a backup request of data managed by the first virtual server from a first one of the plurality of computers that is permitted to access the first virtual server, and wherein the processor backs up the data to the tape device, if the first server is permitted to access the tape device.

10. A method of managing a plurality of virtual servers, the method being implemented in a real server coupled to a plurality of computers, the real server comprising a processor, a memory, a storage device, and an apparatus manager executed by the processor, the method comprising:

configuring, by the processor, the plurality of virtual servers on an operating system, the operating system executing processes for each of the plurality of virtual servers;

receiving, by each of the plurality of virtual servers, a file access request from one of the plurality of computers based on access permission information, the access permission information being set with respect to each of the plurality of virtual servers, and responding, by each of the plurality of virtual servers, to the file access request;

storing, in the memory, routing information and mount information, wherein the storage device of the real server comprises a file system mounted on a root directory of a corresponding virtual server, wherein the apparatus manager is configured to generate and delete each of the plurality of virtual servers, and configured to permit or forbid each of the plurality of virtual servers access to the tape device coupled to the real server, wherein the apparatus manager determines whether a first virtual server of the plurality of the virtual servers is permitted to access the tape device, if the processor receives a backup request of data managed by the first virtual server from a first one of the plurality of computers that is permitted to access the first virtual server, and wherein the processor backs up the data to the tape device, if the first server is permitted to access the tape device;

setting, by the processor, the routing information;

mounting, by the processor, the storage device based on the mount information; and providing, by the processor, a shared file server to the plurality of computers.

11. A method of managing a plurality of virtual servers, the method being implemented in a real server coupled to a plurality of computers, the real server comprising a processor and an apparatus manager executed by the processor, the method comprising:

configuring, by the processor, a plurality of virtual servers on an operating system, the operating system executing processes for each of the plurality of virtual servers;

receiving, by each of the plurality of virtual servers, a file access request from one of the plurality of computers based on access permission information, the access permission information being set with respect to each of the plurality of virtual, and responding, by each of the plurality of virtual servers, to the file access request, wherein the apparatus manager is configured to generate and delete each of the plurality of virtual servers, and configured to permit or forbid each of the plurality of virtual servers access to the tape device coupled to the real server, wherein the apparatus manager determines whether a first virtual server of the plurality of the virtual servers is permitted to access the tape device, if the processor receives a backup request of data managed by the first virtual server from a first one of the plurality of computers that is permitted to access the first virtual server, wherein the processor backs up the data to the tape device, if the first server is permitted to access the tape device, and wherein the plurality of virtual servers perform as at least one of a NIS (Network Information Server), a DNS (Domain Name System) server, a LDAP (Lightweight Directory Access Protocol) server, a Web server, or a proxy server.

* * * * *